United States Patent [19]

Major

[11] Patent Number: 5,090,579
[45] Date of Patent: Feb. 25, 1992

[54] MODULAR SHELVING SYSTEM

[76] Inventor: Ronald P. Major, 5606 Noel Dr., Temple City, Calif. 91780

[21] Appl. No.: 585,488

[22] Filed: Sep. 20, 1990

[51] Int. Cl.⁵ .............................................. A47B 63/00
[52] U.S. Cl. .................................... 211/126; 211/133; 211/187
[58] Field of Search ............... 211/126, 187, 128, 104, 211/133, 88, 193; 108/144, 111

[56] References Cited

U.S. PATENT DOCUMENTS

| | | |
|---|---|---|
| 3,273,720 | 9/1966 | Seiz . |
| 3,330,229 | 7/1967 | Ferdinand et al. . |
| 3,426,993 | 2/1969 | Johansson . |
| 3,570,679 | 3/1971 | Edson . |
| 3,807,822 | 4/1974 | Amore . |
| 3,826,207 | 7/1974 | Sutherlan . |
| 4,231,301 | 11/1980 | Barrineau ........................ 211/187 X |
| 4,250,815 | 2/1981 | Swanson ......................... 211/193 X |
| 4,314,685 | 2/1982 | Schwan . |
| 4,705,175 | 11/1987 | Howard et al. . |
| 4,762,235 | 8/1988 | Howard et al. . |
| 4,862,994 | 9/1989 | Hughes, Sr. . |
| 4,919,282 | 4/1990 | Duff et al. ........................ 211/187 X |

Primary Examiner—Alvin C. Chin-Shue
Assistant Examiner—Sarah Lechok
Attorney, Agent, or Firm—Christie, Parker & Hale

[57] ABSTRACT

A modular shelving system has a plurality of spaced apart vertical members with parallel side surfaces and a plurality of aligned holes defined in the side surfaces. A plurality of tray members are removably installed to the support rails by detent pins which engage the holes in the support rails. Automatic locking by deflectable portions of the tray bottoms locks the tray members to the support rails. Each tray member has a pair of detent pins carried on opposing side walls of the tray member. The detent pins are substantially perpendicular to the bottom of the tray, thus causing the tray to be cantilevered substantially horizontally from the support rails when the detent pins engage the holes in the support rails.

5 Claims, 3 Drawing Sheets

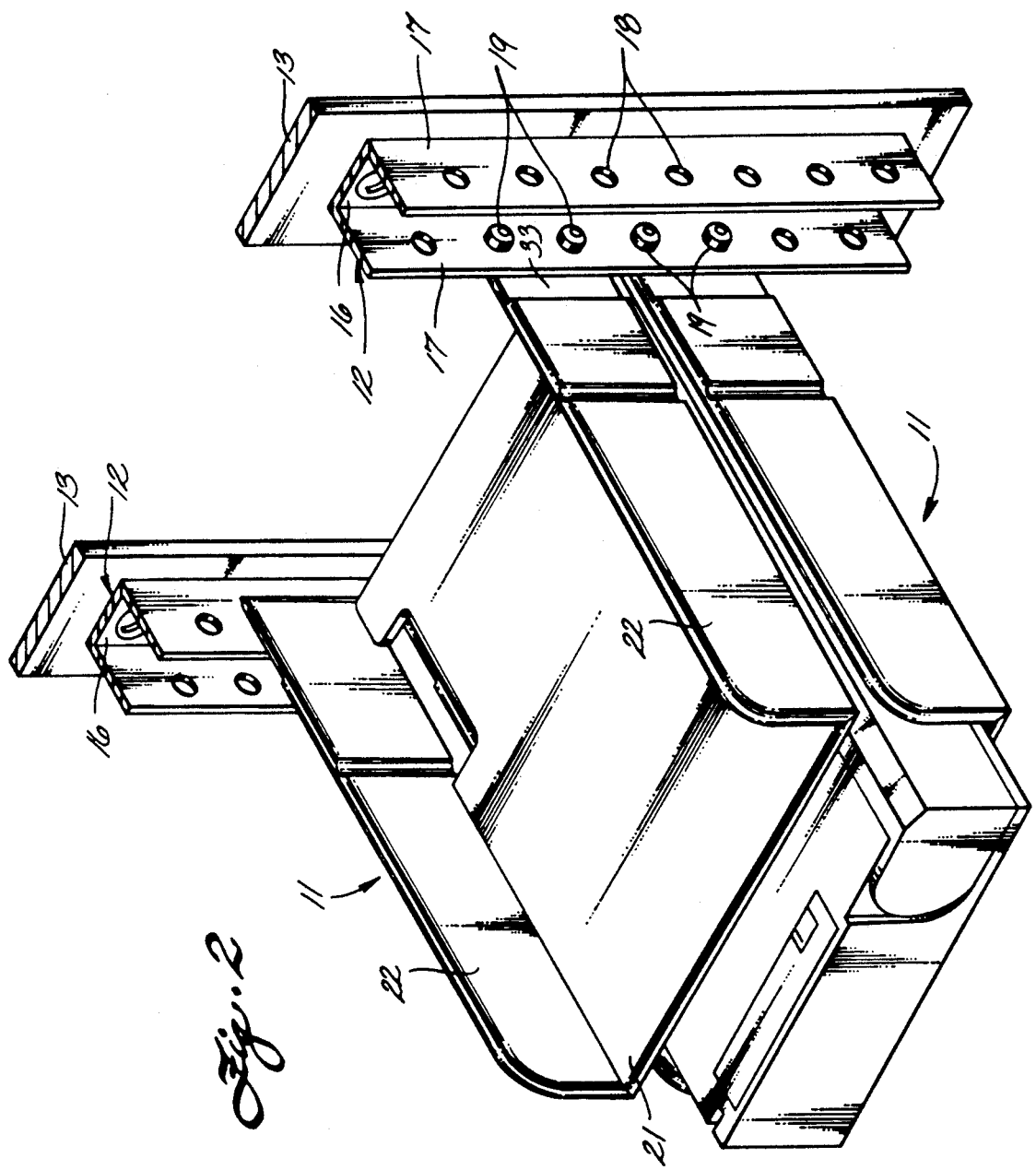

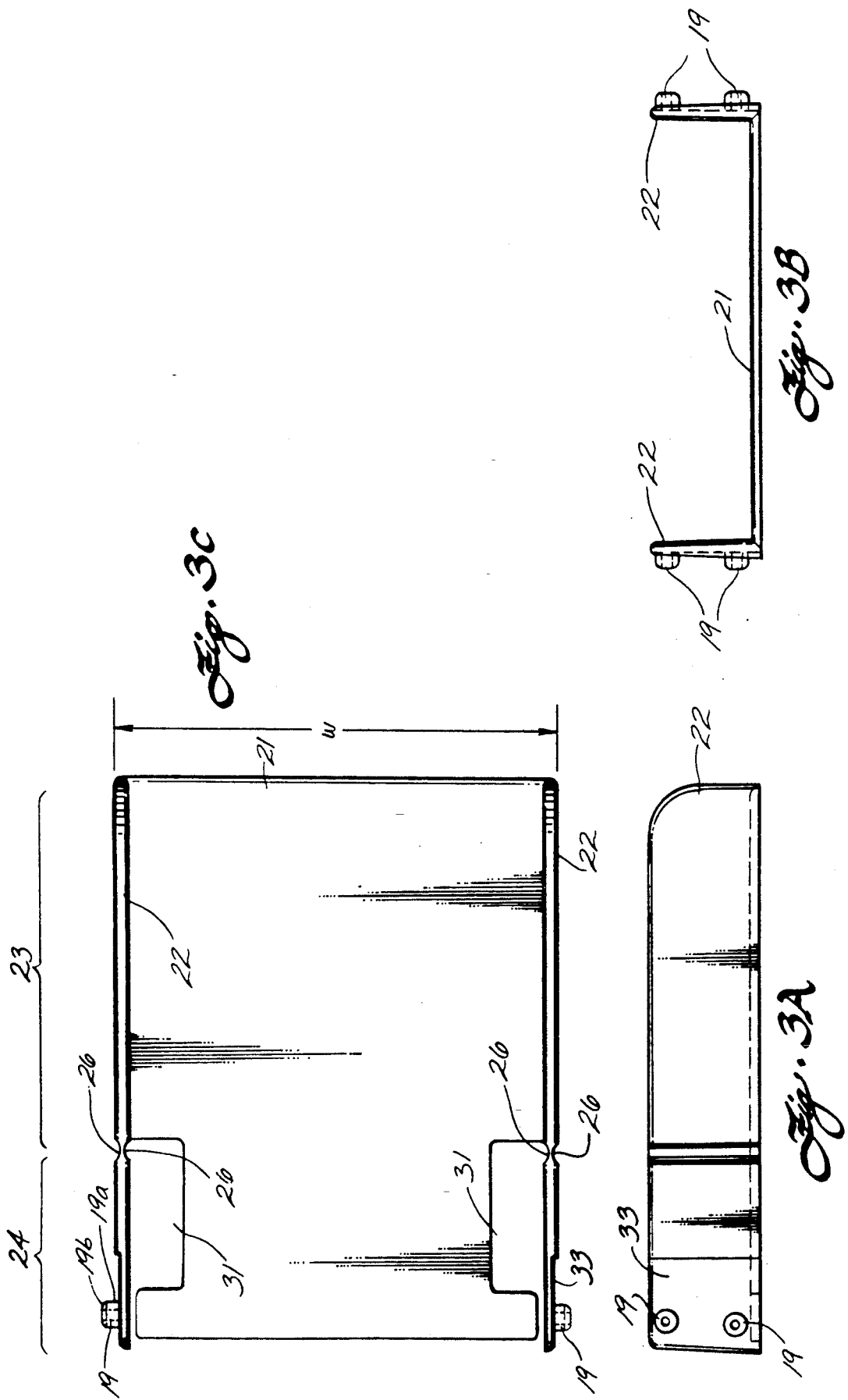

MODULAR SHELVING SYSTEM

FIELD OF THE INVENTION

This invention relates generally to the field of shelving systems, and more particularly, to a modular shelving system for use in storing video cassettes.

BACKGROUND OF THE INVENTION

It is common, where a large number of stored items are to be used often, that the items be organized in some manner to expedite the access to and use of the items. Examples are the storage of LPs in a radio station, the storage of commercials and programs in a radio or television station, or even the storage of music or videos in the home. The items must be organized well to be used effectively.

A common storage medium is a shelf, or a number of shelves. For example, the items can be stacked or lined up along a shelf (such as in a book case). Where the items are removed from and replaced on the shelf often, especially where more than one person is using the items, the items can easily become disorganized. The disorganization occurs because it takes time and effort to figure out where on the shelf the item is supposed to be replaced. This problem increases dramatically where the storage and organization of a large number of items is required.

For example, in the radio or television industry, hundreds of separate commercials and programs for each day of programming are stored on individual cassettes. Often, time constraints in these industries intensify the need for organization of the cassettes so that the proper programming can be selected for use at a moments notice.

SUMMARY OF THE INVENTION

The present invention provides a modular shelving system having a plurality of spaced apart support rails mounted vertically in a frame or other support means. The support rails have at least two opposing faces, each of which have holes defined therein at regular intervals. A plurality of tray members are removably installed to the support rails by means of detent pins which engage the holes in the support rails. Automatic locking means lock the tray members to the support rails upon installation.

Each tray comprises a pair of detent pins carried on opposing side walls of the tray member. The detent pins are substantially perpendicular to the bottom of the tray, thus causing the tray to be oriented perpendicularly to the support rails when the detent pins engage the holes in the support rails. In one embodiment, the detent pins are displaced angularly resulting in an acute angle between the upper side of the tray and the support rails.

BRIEF DESCRIPTION OF THE DRAWINGS

These and other features and advantages of the present invention will be better understood by reference to the following detailed description when considered in conjunction with the accompanying drawings wherein:

FIG. 2 is an enlarged perspective view of a portion of the shelving system detailing one of the trays in the system; and FIGS. 3a, 3b and 3c are side, front and plan views, respectively, of an exemplary tray as used in the system.

DETAILED DESCRIPTION

Figure 1:
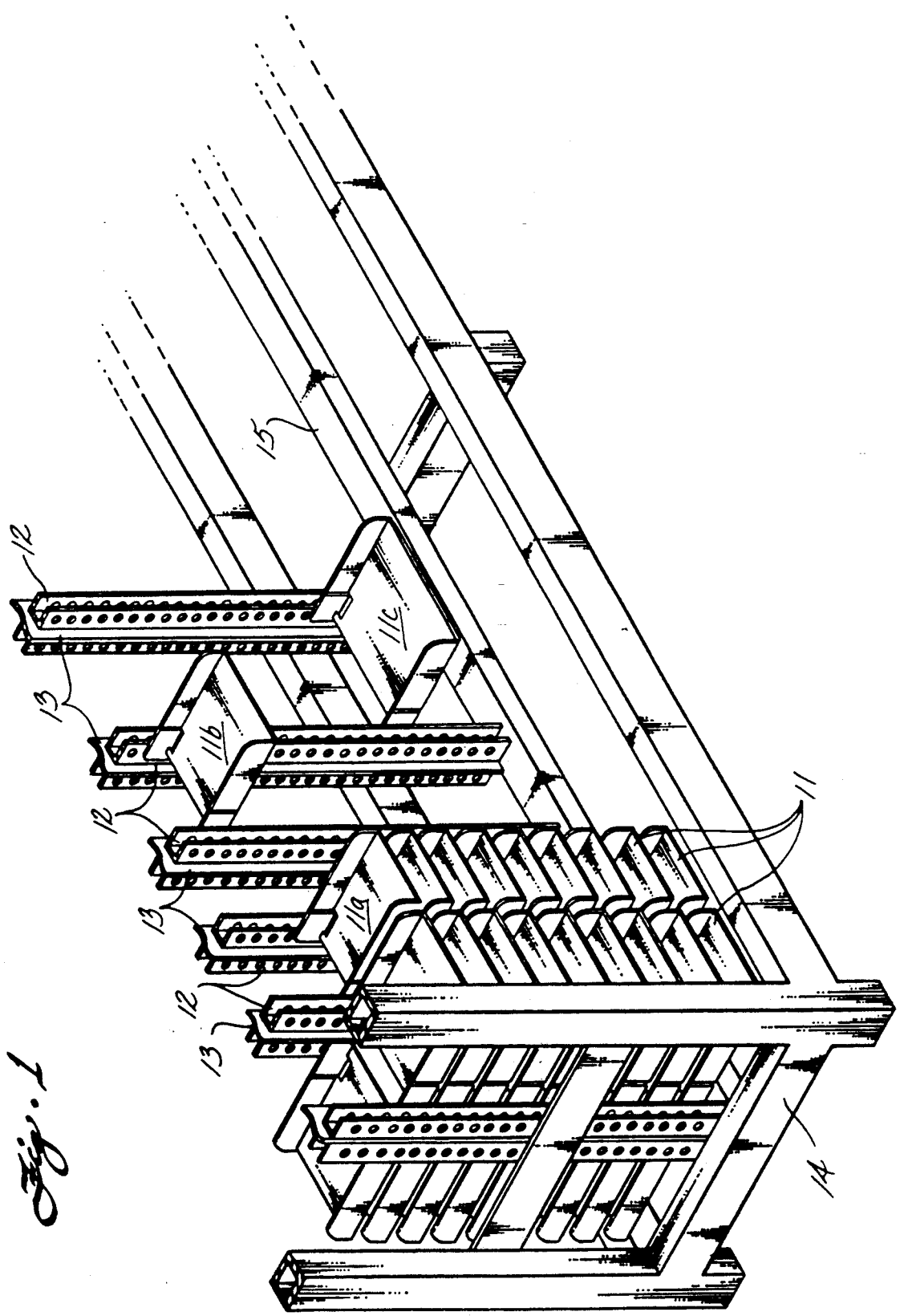
FIG. 1 is a perspective view of an exemplary shelving system.

Referring initially to FIG. 1, an exemplary shelving system has a plurality of tray members 11 removably coupled to a plurality of vertical support members or rails 12. Each support member is connected to a support or rail carrier 13, each of which is in turn connected to a frame 14. Each support member 12 is U-shaped having a back 16, and two parallel sides 17 (FIG. 2). A plurality of pin holes 18 are defined in the parallel sides 17 of each support member 12. In the exemplary embodiment, the pin holes 18 are spaced at a uniform distance to receive detent pins 19 carried on the tray members 11.

In the exemplary embodiment, each support rail 12 has a plurality of mounting holes defined through its back 16. These mounting holes align with holes defined in the rail carrier 13 to aid in fastening the support rails 12 to the rail carriers 13. Connection of the support rails to the rail carrier is achieved with conventional fasteners such as bolts or screws. The mounting holes are preferably indexed relative to the pin holes so that aligning the mounting holes horizontally in the frame will automatically align the pin holes on adjacent support rails. This is important since the pin holes must be aligned to allow for the installation of the tray members 11.

The rail carriers are vertically aligned in the frame and are attached to the frame at each end of the carrier. Specifically, one end of the rail carrier is connected to a longitudinal support 15 at the bottom of the frame, and the other end of the support carrier is connected to a longitudinal support (not shown) at the top of the frame. Also, the rail carriers are preferably wider than the support rails. This increases the rigidity of the rail carriers and also provides a stop for the contents of the tray (i.e., the rail carriers inhibit the contents of the tray from sliding entirely through the tray).

In the illustrative embodiment shown in FIG. 1, the shelving system has the capability of mounting trays which are accessible on both sides of the frame (front and back). This is accomplished by mounting support rails 12 back to back on each face of the rail carriers 13.

In alternate embodiments of the shelving system, the support rails 12 can be attached directly to the inside wall of a cabinet or to a wall by using conventional fasteners. In these alternate embodiments, the rail carriers are not necessary since the cabinet or wall provides the vertical support for the support rails.

Referring now to FIGS. 2 and 3A, B and C, the tray member 11 has a substantially rectangular flat bottom 21 and two sides 22 rising from opposite edges of the bottom. The fore and aft edges of the tray do not have sides attached thereto. A pair of detent pins 19 are carried on the outside face of the sides 22 adjacent to the aft edge of the tray member. The detent pins are aligned substantially perpendicular to the bottom of the tray so that when the pins are engaged with the holes 18 in the support rails 12, the tray is cantilevered outward from the support rails in a substantially horizontal orientation (i.e. in an orientation which is substantially perpendicular to the support rails 12.

In one embodiment of the present invention, the detent pins are aligned at a slight angle, approximately two and one half degrees, relative to the bottom of the tray such that the bottom detent pin is slightly closer to the rear of the tray than the top detent pin. This results in a slight upward tilt of the tray when mounted in the support rails.

The upward tilt of the tray aids in ensuring that the trays contents are fully inserted in the tray, as well as helping to keep the contents of the tray orderly in the case of shock or vibration to the shelving system. Although the angle of the tray bottom is generally not sufficient to cause the tray contents to slide down the incline merely under the effect of gravity (the contents still need to be pushed into the tray), the tilt does inhibit the contents from sliding up the incline when the tray is subject to shock or vibration. Thus, the contents in the shelving system are inhibited from falling out of the trays where the shelving system is struck with an object, such as a person or a chair, or during an earthquake.

Each of the detent pins has a substantially cylindrical base 19a and a substantially rounded top 19b (FIG. 3C). The base of the detent pins is cylindrical to interface with the inner dimension of the pin holes 18 in the support rails. The top of the detent pins are rounded to help the user insert the detent pins into the pin holes. Specifically, the reduced size of the top of the detent pins effectively enlarges the targets (the pin holes) and the rounded nature of the tops of the detent pins allows the detent pins to slide into the pin holes even where they are not initially aligned exactly with the pin holes. The width of the base section of the detent pins, measured perpendicularly from the side of the tray, should be at least as wide as the thickness of the side wall of the support rail.

The forward section 23 of each side 22 intersects the bottom 21 of the tray. However, the aft section 24 of each side does not intersect the bottom of the tray. Instead, the aft section of each side is free of the bottom of the tray and capable of being elastically deflected in a plane which is perpendicular to the bottom of the tray. Deflection of the aft sections of the sides is accomplished by applying a perpendicular force to the sides of the tray. Obviously, the further to the rear of the sides the force is applied, the less force is needed to achieve a given deflection. The ability to deflect the sides is aided by transverse recesses 26 formed in each face of each side of the tray. The transverse recesses 26 are located just aft of the point at which the bottom of the tray connects with the perpendicular sides.

Deflection of the aft sections of the sides of the tray is necessary to mount the tray in the shelving system. The support rails 12 in the shelving system are spaced apart a distance substantially equal to the outside width "w" of the tray, measured from the outer face of one side 22 to the outer face of the opposite side 22. The height of the detent pins makes it impossible to insert the tray between the support rails without deflecting the aft sections 24 of the sides 22 of the tray inward.

At its extreme aft end, the bottom 21 of the tray has a width nearly wide enough to come in contact with the inside face of the perpendicular sides. This feature restricts the inward deflection of the perpendicular sides. However, this restriction can be overcome merely by deflecting the aft section of the tray bottom downward. Deflection of the tray bottom is eased by a pair of recess areas 31 cut in the bottom which reduce the width of the tray bottom beginning at a point just aft of the point at which the bottom 21 intersects the sides 22 of the tray.

This configuration provides an automatic locking mechanism. That is, after the detent pins are inserted in the pin holes in the support rails by deflecting the aft section of the tray bottom downward so that the aft sections of the sides of the tray can deflect inward, the tray bottom is allowed to return to a horizontal position. Thereafter, the trays cannot be removed merely by deflecting the aft section of the sides. Instead, the tray must first be unlocked by deflecting the tray bottom downward. The locking mechanism inhibits the tray from accidentally being dislodged from the support rails.

As best illustrated in FIG. 3C, the bottom of each tray has a relief at its aft end. This relief allows any dust or debris that may accumulate in the tray to be displaced by the loading of the tray contents. Rather than building up in the rear of the tray, the debris will fall from the tray. Also, the front edge of the bottom of the tray and the front and top edges of the sides of the tray are rounded. This serves two purposes, first to make the insertion of contents into the tray easier, and second, to prevent injury which may otherwise be caused by sharp edges.

In an exemplary embodiment, the tray described above is intended to store a video cassette having a standard industrial size of approximately 4.25 inches (10.9 cm) by 6.75 inches (17.2 cm) by 1.25 inches (3.3 cm). The embodiment described above comprises a tray which is approximately 6 inches (15.2 cm) deep, 4.625 inches (11.8 cm) wide and 1.19 inches (3.02 cm) high. The thickness of the bottom of the tray is approximately 0.09 in. (2.28 mm) and the thickness of the sides of the tray is 0.16 in. (4.06 mm).

Alternate embodiments of the present invention provide trays having the same structure and function as the described tray, however the dimensions of the tray are different to accommodate different sized video cassettes. For example, a tray used to hold a second standard industrial sized video cassette (having dimensions of 15.0 by 25.4 by 3.3 cm) is approximately 10.375 in (26.4 cm) wide, 5.25 in (13.3 cm) deep and 1.375 in (3.5 cm) high. An exemplary tray capable of holding a third standard industrial sized video cassette (having dimensions of 20.6 by 36.6 by 3.3 cm) is approximately 14.875 in (37.8 cm) wide, 7.375 in (18.7 cm) deep and 1.375 in (3.5 cm) high.

Each of these trays can be used in the shelving system of the present invention.

The tray can easily be installed without the use of tools. Installation and removal is accomplished by slightly deflecting the aft section of the tray bottom downward while inwardly deflecting the aft sections of the sides of the tray. The trays are most easily installed beginning at the bottom of each tray column to allow easy access to the inside of each tray. Also individual trays can be replaced, for example, in the case of damage, without removing and re-installing any tray other than the damaged tray.

The shelving system of the present invention is highly modular in nature. For example, the user can adapt the size and shape of the shelving system to fit a multitude of storage spaces. The width or number of columns of shelves of the shelving system can be manipulated merely by adding or deleting support rails. The height of the system can be altered by trimming the height of the support rails, or alternatively, manufacturing shorter or longer support rails. Further, the trays can be mounted back to back or on a single side of the system.

Trays of different sizes can be used in the same system merely by adjusting the space between each support rail.

For example, in the shelving system illustrated in FIG. 1, tray members 11a, 11b and 11c each have a different width. To accommodate this, the rail carriers 13 are connected to the frame 14 at varying spaced apart intervals corresponding to the width of the tray members. Specifically, the rail carriers are spaced apart a sufficient distance to allow the tray members to engage the support rails mounted on the rail carriers.

The dimension of the overall shelving system is controlled horizontally by the number of support rails and rail carriers installed, and vertically by the height of the same. In an exemplary embodiment, the mounting holes in the support rails are pre-drilled at regular intervals equal to the width of no more than two tray members. Thus, regardless of the height of the support rail, there will always be adequate mounting holes near to the end of the support rails to ensure rigidity in the shelving system.

In one embodiment of the present invention, the shelving system is manufactured as component parts of a kit thus allowing the user to define the dimensions of the system.

In an exemplary embodiment, the trays are made from injection molded plastic. The plastic ran be colored, for example, by adding colored pigment to the plastic prior to the formation of the trays, to produce trays of different colors. The trays, and therefore the contents of the trays, can be color coded without having to attach identifying tags or colors to the trays or shelving system. Arrangement of the color code can be changed at will simply by moving the trays to different locations within the shelving system.

In such an embodiment, each of the sides has a draft or taper such that the upper portion of each side is slightly narrower than the nominal thickness and the lower portion of each side is slightly thicker than the nominal thickness. The die used to mold the tray member is given this taper so the tray can be withdrawn from the die. In the described embodiment, the taper is removed from the face of the side elements which carries the detent pins in the area adjacent to the pins 33. This area 33 is perpendicular to the bottom of the tray member and it is substantially parallel to the support rails when the tray is installed in the shelving system. Since the sides of the tray are parallel to the support rails at the point they engage the support rails, the base 19a of each detent pin abuts the support rail. This ensures that each detent pin adequately engages the pin holes 18 in the support rails.

The preceding description has been presented with reference to the presently preferred embodiment to the invention shown in the drawings. Workers skilled in the art and technology to which this invention pertains will appreciate that alterations and changes in the described structures can be practiced without departing from the spirit, principles and scope of this invention.

For example, the shelving system of the present invention can incorporate support rails which have a series of aligned pins on their side surfaces, and the tray members can have holes defined in the deflecting side elements to interface with the pins on the vertical members.

Accordingly, the foregoing description should not be read as pertaining only to the precise structure described, but rather, should be read consistent with, and as support for, the following claims which are to have their fullest, fair scope.

What is claimed is:

1. A modular shelving system comprising:
   at least two spaced apart vertical members with substantially parallel side surfaces and a series of aligned engagement means disposed in the side surfaces; and
   a plurality of tray members removably coupled to the vertical members, each tray member being of unitary construction and having means for interacting with the engagement means in each of the side surfaces for suspending the tray members from the vertical members in a substantially horizontal cantilever orientation,
   wherein the engagement means are holes and the means for interacting comprises a pair of detent pins connected to the tray members, the detent pins being spaced apart to align with any two holes defined in the side surfaces of the vertical members; each of the tray members comprise means for locking the detent pins in the holes defined in the side surface; the tray members comprise deflectable side elements, which can be deflected from a neutral position to align the detent pins with the holes in the side surfaces of the vertical members, and which return to the neutral position to engage the detent pins with the side surfaces; and the tray members comprise a deflectable bottom element, which can be deflected from a neutral position adjacent to the side elements of the tray members to a position substantially remote from the side elements.

2. A modular shelving system as recited in claim 1 wherein the side elements are inhibited form being deflected while the bottom element is in its neutral position and the side elements are capable of being deflected while the bottom element is in its deflected position.

3. A modular shelving system as recited in claim 2 wherein each of the side elements comprise a transverse recess area of reduced thickness to ease the deflection of the side elements in response to a deflection force exerted on the side elements.

4. A unitary shelf member for use in a shelving system having a plurality of spaced apart vertical members each having parallel side surfaces and a series of aligned holes disposed in the side surfaces, the unitary shelf member comprising:
   a bottom element;
   a pair of side elements, a front portion of each side element being connected substantially perpendicularly to the bottom element at opposite edges of the bottom element; and
   a pair of detent pins connected to the rear portion of each side element for engaging the holes disposed in the side surfaces of the vertical members,
   wherein the rear portion of the side elements are inwardly deflectable and a portion of the bottom element is in the deflecting plane of the side elements and thus inhibits their inward deflection.

5. A unitary shelf member as recited in claim 4 wherein the portion of the bottom element in the deflecting plane of the side elements can be temporarily removed from said plane to enable the side elements to be deflected inwardly.

* * * * *

UNITED STATES PATENT AND TRADEMARK OFFICE
CERTIFICATE OF CORRECTION

PATENT NO. : 5,090,579
DATED : February 25, 1992
INVENTOR(S) : Ronald P. Major It is certified that error appears in the above-identified patent and that said Letters Patent is hereby corrected as shown below:

Column 2, line 28, change "cf" to -- of --.

Column 3, line 6, change "t:.ay" to -- tray --.

In the Claims

Column 6, line 36, change "form" to -- from --.

Signed and Sealed this

Twenty-fourth Day of August, 1993

Attest:

BRUCE LEHMAN

Attesting Officer    Commissioner of Patents and Trademarks